United States Patent
Farmont

[11] Patent Number: 5,816,647
[45] Date of Patent: Oct. 6, 1998

[54] LOUVER ARRANGEMENT FOR VEHICLE SUN ROOFS, ESPECIALLY TRANSPARENT ONES

[75] Inventor: Rolf Farmont, Dusseldorf, Germany

[73] Assignee: Westmont Technik GmbH & Co. KG, Germany

[21] Appl. No.: 622,205

[22] Filed: Mar. 27, 1996

[51] Int. Cl.$^6$ ........................................... B60J 7/047
[52] U.S. Cl. ...................... 296/220; 160/202; 160/DIG. 2
[58] Field of Search ..................... 296/220, 214; 160/202, 197, 211, 216, DIG. 2

[56] References Cited

U.S. PATENT DOCUMENTS

| | | | |
|---|---|---|---|
| 1,272,983 | 7/1918 | Menzo | 160/202 |
| 1,387,062 | 8/1921 | Marshall | 160/202 |
| 5,603,372 | 2/1997 | Farmont et al. | 296/220 |

FOREIGN PATENT DOCUMENTS

| | | | |
|---|---|---|---|
| 208672 | 1/1957 | Australia | 296/220 |
| 571641 | 1/1976 | Germany . | |
| 3506460 | 1/1986 | Germany . | |
| 4404618 | 3/1995 | Germany . | |

*Primary Examiner*—Gary C. Hoge
*Attorney, Agent, or Firm*—Vickers, Daniels & Young

[57] ABSTRACT

A louver arrangement for vehicle sun roofs such as transparent sun roofs. The louver arrangement has two or more louvers that are guided between two parallel guide profiles. Each louver has a guide element positioned at each end of the louver to guide the movement of the louver in the guide profiles.

16 Claims, 5 Drawing Sheets

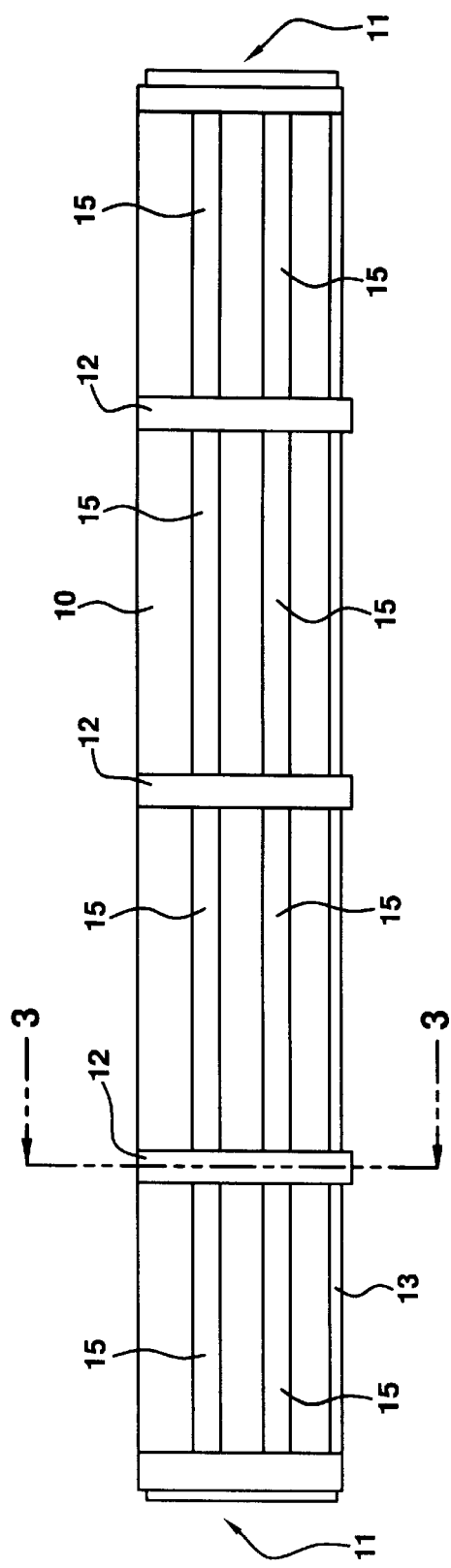
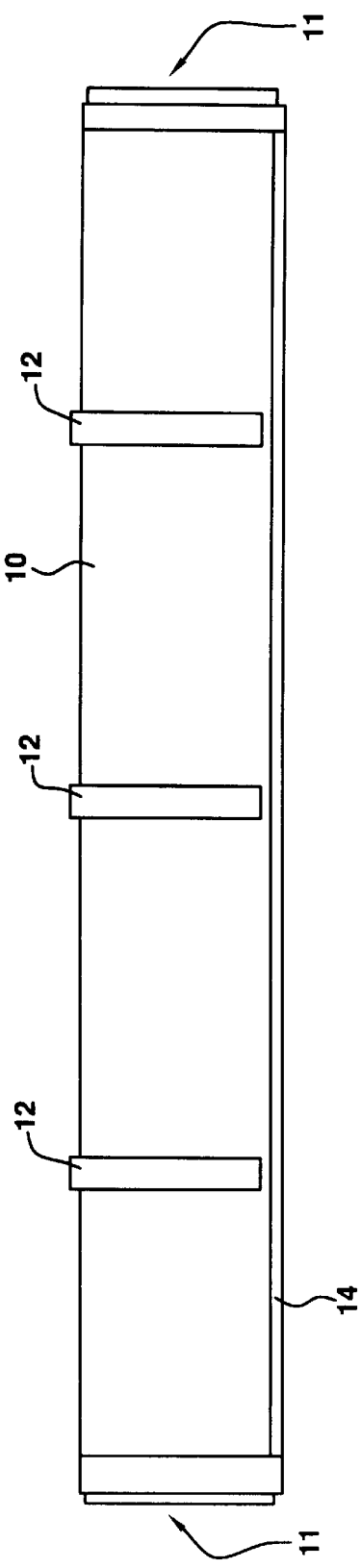

LOUVER ARRANGEMENT FOR VEHICLE SUN ROOFS, ESPECIALLY TRANSPARENT ONES

The present invention relates to the art of vehicle sun roofs and more particularly to a louver arrangement for a vehicle sun roof. The invention is applicable for using a louver arrangement for vehicle roof windows of all types, like sliding roofs with a cover plate that can be shifted beneath the roof covering of a vehicle roof, spoiler roofs with a cover plate that can be moved upward from the roof opening and backward in the direction of travel of the vehicle, lifting roofs, folding roofs, as well as other types of openable hatches in vehicles.

BACKGROUND OF THE INVENTION

A louver arrangement that can be used instead of a sliding roof is known from DE-C1-4404618. The German patent illustrates that the catches. During opening in the vehicle roof covering covered by the louver arrangement, the hooking ridge of a moved louver slides over a still resting louver until it encounters a hooking ridge of this resting louver and is hooked to it. During further movement of the already moved louver, the previously resting louver is carried along by the hooking ridge. During the closure of the louver arrangement, catching of the louvers occurs in similar fashion. Each of the louvers have effective sealing elements between louvers for sealing.

It is also possible to configure these hooking ridges as knobs arranged on a line parallel to the opening direction of the louver arrangement and to use this arrangement without sealing elements as a darkening device of a vehicle sun roof.

The best possible air permeability of the louver arrangement is desired even in the open sun roof and in the state of the louvers when they cover the opening. This also applies in particular at high driving speeds. In the known louver arrangements to be used as a darkening device of a vehicle, these requirements mean that the louvers must be designed roughly as strong as the louvers serving as a sun roof replacement, since the air streams that occur would otherwise cause severe buckling of the louvers, which would adversely affect their air permeability, especially in the condition when they cover the opening. This type of robust design of this louver arrangement, on the one hand, is relatively cost-intensive and, on other hand, leads to an unattractive, especially unrefined appearance.

SUMMARY OF THE INVENTION

In accordance with the present invention, there is provided a louver arrangement designed to guarantee optimal ventilation under all operating conditions with the lightest possible but still stable design. The louver arrangement for vehicle sun roofs includes at least two louvers that are guided between fixed guide profiles, which guide profiles are spaced at an essentially constant spacing. Each louver is provided with guide element pairs which are arranged between three front ends and are guided in fixed guide profiles for mutual guiding of the louvers. The guide elements can be formed here by the louvers, especially by the upper or lower region of the louver, or designed in one piece with each louver. It is understood that assemblies of all known, imaginable types of guiding can find advantageous application as guide elements according to the invention.

In accordance with another aspect of the present invention, the louver guide that moves with the corresponding louver and can be integrated simply and inconspicuously in the louver arrangement is formed by the guide element pairs according to the invention. In particular, no guide rails that divide the opening in the opened louver arrangement are required. The louver guiding according to the invention advantageously increases the torsional rigidity of the individual louvers with reference to the longitudinal direction of the louvers. Because of this the louvers retain their optimal position even at high driving speeds.

To achieve the aforementioned desired advantages it can already be sufficient if the guide elements have sliding surfaces that form guide tracks arranged parallel to the fixed guide profiles. Such guide elements are particularly simple in configuration when the sliding surfaces each face the neighboring louver.

Mutual guiding of the louvers is stabilized if the cooperating guide elements of a guide element pair together form a shape-mated connection.

In accordance with another aspect of the present invention, another measure to stabilize guiding that is also to be applied cumulatively is an arrangement of the louvers so that the louvers exert forces on each other via the corresponding guide element pair with a component perpendicular to the plane of opening. This can be achieved, for example, by a somewhat larger configuration of at least one guide element in a direction perpendicular to the plane of opening. On the other hand, it is also possible to provide at least one louver with a deviating radius of longitudinal curvature with reference to the other louver(s) so that at least two of the louvers are fastened to each other with a component perpendicular to the plane of opening at least in the state in which they cover the opening.

In this case the guide elements themselves impart an intrinsic rigidity to the louvers, stabilizing them against buckling caused by relative wind. For this purpose it is particularly a advantageous if the guide elements have a design component that faces away from the louver. It is also possible to extend the guide elements over the width of the louvers. In this case the width of the louver is defined as the longitudinal direction of the louver essentially parallel to the fixed guide profiles. In this fashion it can be made possible for the louvers to be mutually guided over a longer guiding zone. This longer guiding zone follows from the fact that the two guide elements can be brought into contact over a greater surface and means that the two louvers are mutually stabilized.

This effect can be further intensified by a guide continuation that lengthens mutual guiding of the louvers essentially parallel to the fixed guide profiles. All guide lengthenings that can be gathered from the prior art are suitable as such lengthening. For example, this can be the formation of a lengthened sliding surface, which means that the two guide elements of a guide element pair mutually guide over a larger surface, especially in the closed state of the louver arrangement.

Depending on the specific embodiment, the guide elements can consequently serve for stabilization of the louvers in two ways: on the one hand, by increasing the intrinsic rigidity of each louver, especially over its width and, on the other hand, by mutual support of two louvers.

In accordance with still another aspect of the present invention, the guide element pairs are spaced from each other and/or from the front ends of the louvers guided in the fixed guide profiles. This makes it possible to make the guiding zone of each guide element pair longer, since in this fashion the air resistance caused by the guide elements that constrict a ventilation gap provided between the louvers can be kept as low as possible.

In accordance with still yet another aspect of the present invention, the louvers can have additional assemblies that serve for stabilization. For example, a stabilizer placed essentially parallel to the longitudinal extent of the louver can be provided. In this case the stabilizer can be provided on the side of a louver facing the ventilation gap. An adverse effect on ventilation caused by this can be avoided by spacing the stabilizer from the long edges of the louvers. The stabilizers are then arranged outside of the smallest cross section of the ventilation gap between louvers in the state covering the roof opening so that they do not adversely affect the air flow.

It is possible in particular to provide the stabilizers and the guide elements on the side of the louvers facing the passenger compartment so that they do not adversely affect the appearance of the louver arrangement or only insignificantly so. In this fashion the louver arrangement can be designed relatively light but sufficiently stable. Undesired buckling of the louvers by relative wind can be avoided despite the light design.

In summary, there is provided a louver arrangement for vehicle sun roofs, preferably for transparent sun roofs, which arrangement has at least two louvers that are guided between fixed guide profiles at essentially constant spacing. The louvers are provided with guide element pairs that are arranged between their front ends and are guided in the fixed guide profiles for mutual guiding of louvers. Preferably, the louver arrangement includes guide elements having sliding surfaces that form guide tracks to form elongated guide tracks arranged parallel to the fixed guide profiles. Preferably, the sliding surfaces each face the neighboring louver. The louver arrangement also preferably includes interacting guide elements that are paired together to form a shape-mated connection. Preferably, the louver arrangement is designed so that the louvers exert forces on each other by means of the corresponding guide element pairs with a component perpendicular to the plane of the roof opening, which places the louvers mutually under tension. Preferably, at least one louver has a deviating longitudinal radius of curvature with reference to the other louvers so that at least two of the louvers are fastened to each other with a component perpendicular to the plane of the roof opening at least in the state in which the opening is covered. Furthermore, the louver arrangement preferably includes a ventilation gap that is provided between the at least two louvers at least in the state in which the opening is covered. Preferably, the smallest cross-section of ventilation gap is provided essentially perpendicular to a plane aligned essentially perpendicular to a plane aligned essentially parallel to at least one louver. The ventilation gap is also preferably interrupted by at least one guide element of each guide element pair. Preferably, the louver arrangement includes at least two spaced guide element pairs that are provided between the at least two louvers. Preferably, at least one guide element of each of the at least two-spaced guide element pairs has a design component facing one of the louvers, preferably perpendicular to a plane aligned essentially parallel to at least one louver and facing one louver. The louver arrangement also preferably includes at least one of the guide element pairs that is spaced from the front ends guided in the fixed guide profiles. The louver arrangement further preferably includes at least one guide element of at least one guide element pair that extends essentially over the entire extent of louver on which the guide element is provided essentially parallel to the fixed guide profiles. The louver arrangement also preferably includes at least one guide element and at least one guide element pair and has a guide continuation that lengthens mutual guiding of louvers essentially parallel to the guide profiles. Preferably, the louver arrangement includes a ventilation gap that is provided between the at least two louvers at least in the state in which the opening is covered and a stabilizer positioned essentially parallel to the longitudinal extent of louver is provided on at least one louver. Preferably, the smallest cross-section of a ventilation gap is provided essentially perpendicular to a plane aligned essentially parallel to at least one louver and that the stabilizer encompasses a component facing away from louver parallel to the smallest cross-section. Preferably, the stabilizer is provided on a side of louver facing the ventilation gap. Preferably, the stabilizer is provided with spacing from the longitudinal edges of the louvers.

The aforementioned components to be used according to the invention, as well as those claimed and described in the practical examples, are not subject to any special exceptional conditions in terms of size, shape, choice of material and technical design so that the selection criterion known in the corresponding area of application can find unlimited application.

Additional details, characteristics and advantages of the object of the invention follow from the subsequent description of the appended drawing in which, for example, preferred variants of the louver arrangement according to the invention is shown.

BRIEF DESCRIPTION OF THE DRAWINGS

Reference may now be made to the drawings, which illustrate various embodiments that the invention may take in physical form and in certain parts and arrangements of parts wherein:

FIG. 2a shows a louver of the louver arrangement according to the invention according to FIG. 1a and 1b in a top view;

FIG. 2b shows the louver according to 2a seen from below;

DETAILED DESCRIPTION OF PREFERRED EMBODIMENTS

Figure 1A:
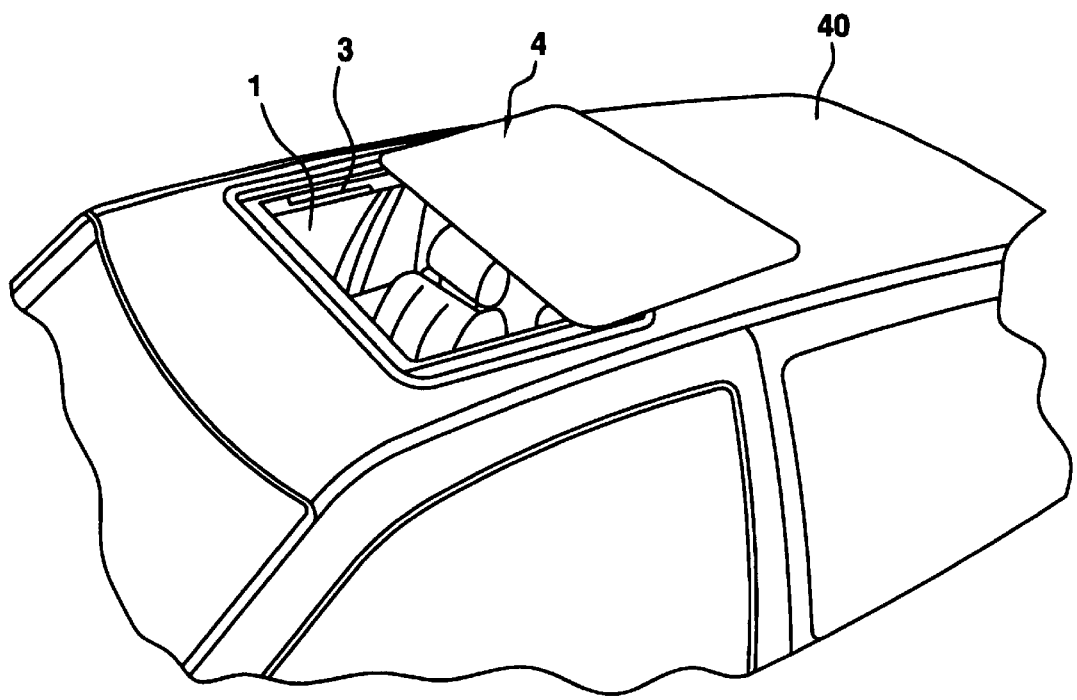
FIG. 1a shows a louver arrangement according to the invention under a vehicle sun roof opened in the spoiler position in a perspective view.
Figure 1B:
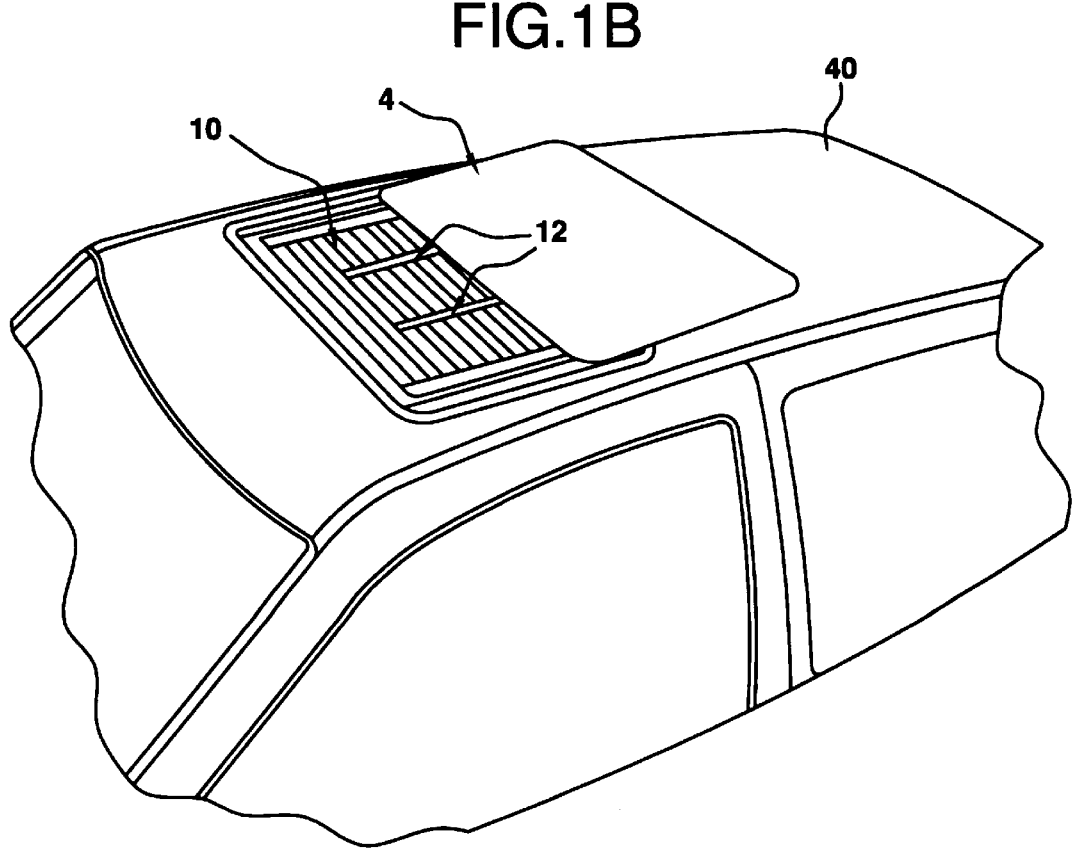
FIG. 1b shows the louver arrangement according to FIG. 1a in the same view as in FIG. 1a, but in which the sun roof was left out.

Referring now to the drawings, wherein the showings are for the purpose of illustrating the preferred embodiments of the invention only and not for the purposes of limiting the same, FIGS. 1a and 1b illustrate a louver arrangement according to the invention is provided beneath a sun roof 4 in the opening of the roof covering 40 of the vehicle.

The louver 10 shown in FIGS. 2a and 2b has two guide elements 12 between its front ends 11 guided in fixed guide profiles 3. Rearward in the direction of travel the louver 10 has on its top a leading edge 13 (see FIGS. 2a, 3 and 4). This leading edge 13 can serve, on the one hand, to improve flow properties, but on the other hand, also for stabilization of louver 10. In addition, the louver 10 frontward in the direction of travel has on its bottom a handle 14, which can serve for stabilization and influencing of the flow properties, in addition to its purpose of louver movement. The louver 10 additionally has on the top stabilizers 15 (preferably protruding) that serve for transverse stiffening of louvers 10. The stabilizers 15 and the leading edge 13, as well as the region of louver 10 arranged near leading edge 13, are interrupted by guide elements 12.

Figure 3:
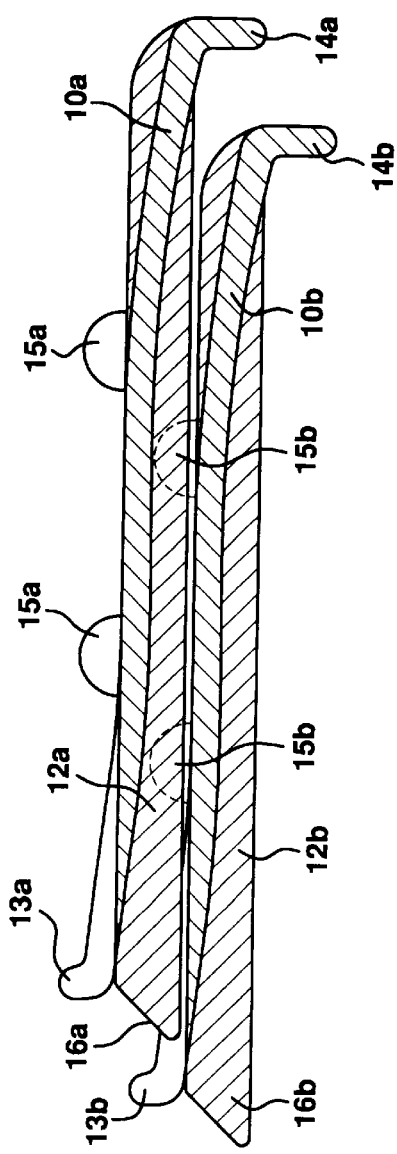
FIG. 3 shows the louver arrangement according to FIGS. 1a and 1b consisting of two louvers in the section along III—III in FIG. 2a in the state in which the roof opening is exposed.
Figure 4:
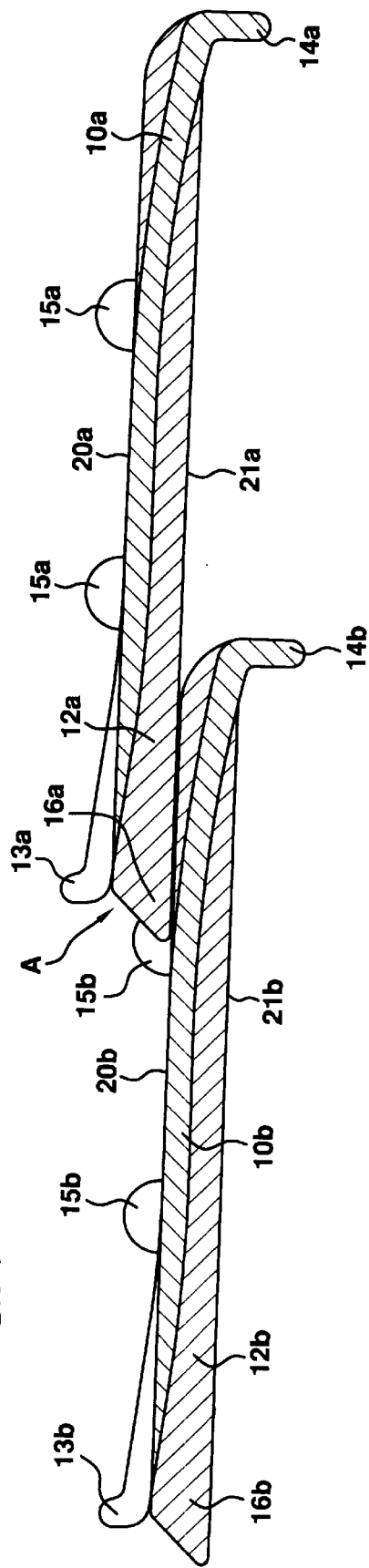
FIG. 4 shows the louver arrangement according to FIGS. 1a and 1b in the same type of view as in FIG. 3 in the state in which the roof opening is covered.

The arrangement of two louvers 10a and bob shown in FIGS. 1a to 2b (the numbering of the individual assemblies of the corresponding louvers is retained, but the reference numbers of louvers arranged frontward in the direction of travel and farther up are marked with "a", whereas the components of the louvers arranged frontward in the direction of travel and farther downward are marked with "b") is apparent from FIG. 3 in the opened state and from FIG. 4 in the state in which the roof opening is covered. In the state in which the roof opening is covered a ventilation gap remains between the two louvers 10a and 10b. This is indicated with arrow A in FIG. 4. It is understood that this ventilation gap A is present only to the right and left of the guide element pairs formed by the guide elements 12a and 12b.

The guide elements 12a and 12b each have an upper sliding surface 20a and 20b and a lower sliding surface 21a and 21b. The sliding surfaces 20a, 20b, 21a and 21b are each designed parallel to each other. The lower sliding surface 21a and the upper sliding surface 20b form an elongated guide track arranged parallel to the fixed guide profiles. In order to achieve the best possible guiding properties in (as shown in FIG. 4) louvers 10a and 10b arranged in offset fashion, the guide elements 12a and 12b have a guide lengthening in the rearward region in the direction of travel, formed in this practical example as guide continuation 16a and 16b.

Figure 5:
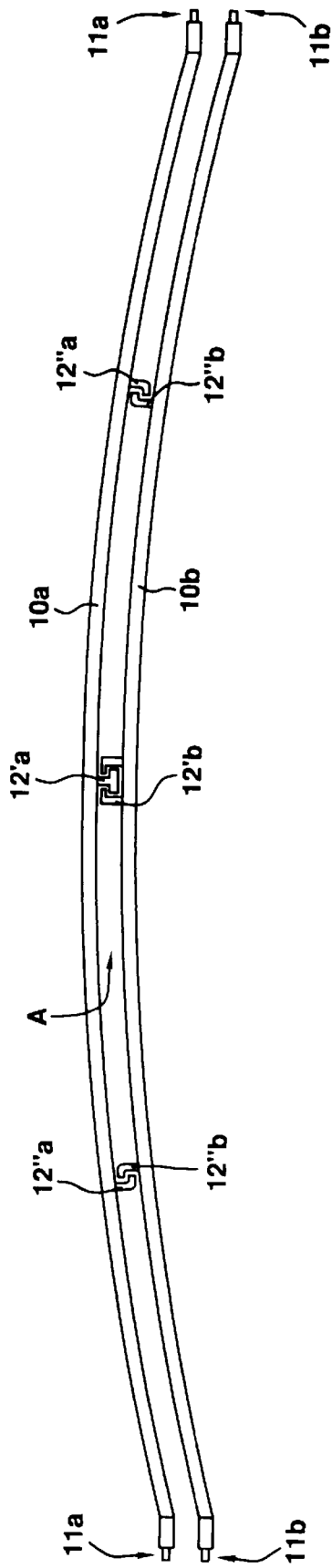
FIG. 5 shows another variant of a louver arrangement according to the invention with guide element pairs forming a shape-mated connection in a view parallel to louver guiding.
Figure 6:
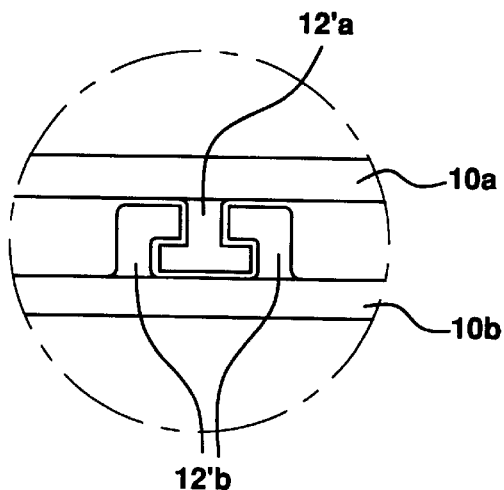
FIG. 6 shows a view of the center guide element pair of the louver arrangement according to FIG. 5 in a cut-away enlargement.
Figure 7:
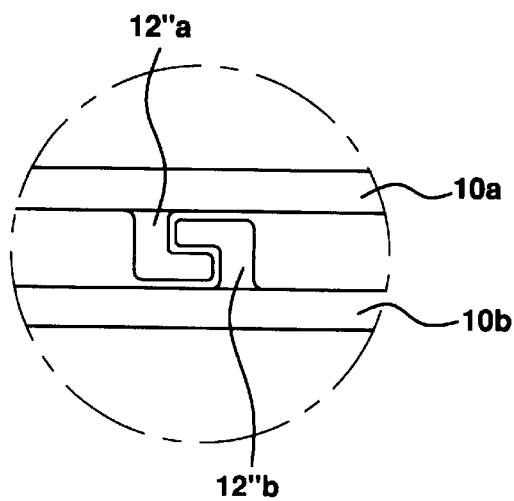
FIG. 7 shows a view of the left guide element pair of the louver arrangement according to FIG. 5 in a cut-away enlargement.
Figure 8:
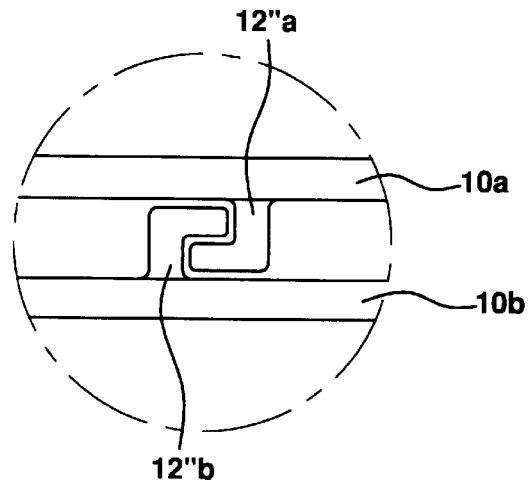
FIG. 8 shows a view of the right guide element pair of the louver arrangement according to FIG. 5 in a cut-away enlargement.

The louver guiding according to the invention can be further stabilized by guide elements 12'a, 12'b, 12"a and 12"b, which are shape-mated with reference to a component perpendicular to the plane of roof opening (see FIGS. 5 to 8). The guide element pair formed by guide elements 12'a and 12'b arranged in the center of the louver shown in FIG. 6 has a T-shaped guide element 12'a on louver 10a that is encompassed by a guide element 12'b of louver 10b consisting of two L-shaped partial pieces. The guide element pairs arranged on the right and left sides in FIG. 5 are, as shown in particular by FIGS. 7 and 8, formed by L-shaped intermeshing guide elements 12'a and 12'b.

It is understood that the guide elements 12'a, 12'b and 12"a and 12"b can have unnumbered sliding planes only upward or downward, depending on the requirements, instead of sliding planes on the top and bottom parallel to louvers 10a and 10b.

As shown in FIG. 5, the louvers 10a and 10b can have a longitudinal radius of curvature. The guiding forces can be controlled, for example, by different longitudinal radii of curvature of louvers 10a and 10b. It is also conceivable with equal spacing of the louver front ends 11a and 11b to make the guide elements 12 or 12a, 12b, 12'a, 12'b, 12"a, 12"b larger or smaller in a direction toward the neighboring louver 10a or 10b in order to control the guiding forces that occur. It is also possible to arrange the sliding planes 20a, 20b, 21a and 21b not parallel to each other and/or not parallel to the fixed guide profiles 3 so that the corresponding guiding forces depend on the position of louvers 10a and 10b relative to each other.

By means of the louver guiding according to the invention vibrations that occur can be reduced in particular and possible flapping of louvers 10a and 10b avoided.

The invention has been described with reference to a preferred embodiment and alternates thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

I claim:

1. A louver arrangement for selectively closing a sunroof opening in a vehicle roof, said opening having spaced apart longitudinal sides and guide means extending along each said side, said louver arrangement comprising at least two louvers extending between said sides of said opening and parallel to one another, each of said louvers having ends slidable in said guide means, a bottom side and a top side, a leading edge transverse to said guide means, a trailing edge parallel to said leading edge, at least one pair of guide elements extending transverse to said leading and said trailing edges, said one pair of guide elements comprising a first guide element on the top side of one of said louvers and a second guide element on the bottom side of the other said louvers, said guide elements interengaging to guide relative sliding displacement of said louvers in the direction between said leading and said trailing edges.

2. The louver arrangement in accordance with claim 1 wherein said pair of guide elements have slidably engaging surfaces that form guide tracks arranged parallel to said guide means.

3. The louver arrangement in accordance with claim 2 wherein said slideably engaging surfaces each face the corresponding louver.

4. The louver arrangement in accordance with claim 1 wherein said first guide element and said second guide element are contoured for mating interengagement.

5. The louver arrangement in accordance with claim 1 wherein said first guide element and said second guide element interengage to provide a ventilation gap between said top side of one said one louver and said bottom side of said other louver.

6. The louver arrangement in accordance with claim 1 wherein at least one of said first guide element and said second guide element extends between said leading edge and said trailing edge and parallel to said guide means.

7. The louver arrangement in accordance with claim 1 wherein at least one of said first guide element and said second guide element includes a portion which extends beyond said leading edge of at least one of said one and said other louver.

8. The louver arrangement in accordance with claim 1 wherein at least one of said louver comprises at least one stabilizer parallel to said leading edge of said at least one louver.

9. The louver arrangement in accordance with claim 8 wherein said at least one stabilizer is between said leading edge and said trailing edge of said at least one louver.

10. The louver arrangement in accordance with claim 8 wherein said at least one stabilizer is adjacent to at least one of said leading edge and said trailing edge of said at least one louver.

11. The louver arrangement in accordance with claim 4 wherein said first guide element and said second guide element are L-shaped, said first guide element comprising first and second legs respectively extending perpendicularly to and parallel to said top side of said one louver, said second guide element comprising first and second legs respectively extending perpendicularly to and parallel to said bottom side of corresponding said other louver, said second legs overlapping to form said contour for mating interengagement.

12. The louver arrangement in accordance with claim 4 wherein said first guide element is T-shaped comprising one leg extending perpendicularly and a second leg extending parallel from one of said one and other louver, said second leg attached to said first leg at the midpoint of said second leg, said second guide element being a channel parallel to said guide means and opening away from the other of said one and other louvers, said second leg of said first guide element received in said channel for said second leg and said channel to provide said contours for mating interengagement.

13. The louver arrangement in accordance with claim 1 further including a plurality of pairs of said guide elements, each pair comprising a first guide elements and a second guide elements contoured for mating interengagement.

14. The louver arrangement in accordance with claim 13 wherein said first and said second guide element of at least one pair of said plurality of pairs of guide elements is L-shaped, said first guide element comprising a first and a second leg respectively extending perpendicularly to and parallel to said top side of said one louver, said second guide element comprising a first and a second leg respectively extending perpendicularly to and parallel to said bottom side of corresponding said other louver, said second legs overlapping to form said contour for mating interengagement.

15. The louver arrangement in accordance with claim 13 wherein said first guide element of at least one pair of said plurality of pairs of guide elements is T-shaped, said first guide element comprising one leg extending perpendicularly and a second leg extending parallel from one of said one and other louver, said second leg attached to said first leg, and wherein said second guide element includes a channel parallel to said guide means and open away from the other of said one and other louvers, said second leg of said first guide element received in said channel for said second leg and said channel to provide said contours for mating interengagement.

16. The louver arrangement in accordance with claim 15 wherein said first guide element of at least one pair of said plurality of pairs of guide elements is L-shaped, said first guide element comprising a first and a second leg respectively extending perpendicularly to and parallel to said top side of said one louver, said second guide element comprising a first and a second leg respectively extending perpendicularly to and parallel to said bottom side of corresponding said other louver, said second legs overlapping to form said contour for mating interengagement.

* * * * *